Oct. 6, 1953   C. A. FRANKENHOFF   2,654,674
DIATOMACEOUS EARTH AND PORTLAND CEMENT COMPOSITIONS
Filed Oct. 9, 1950
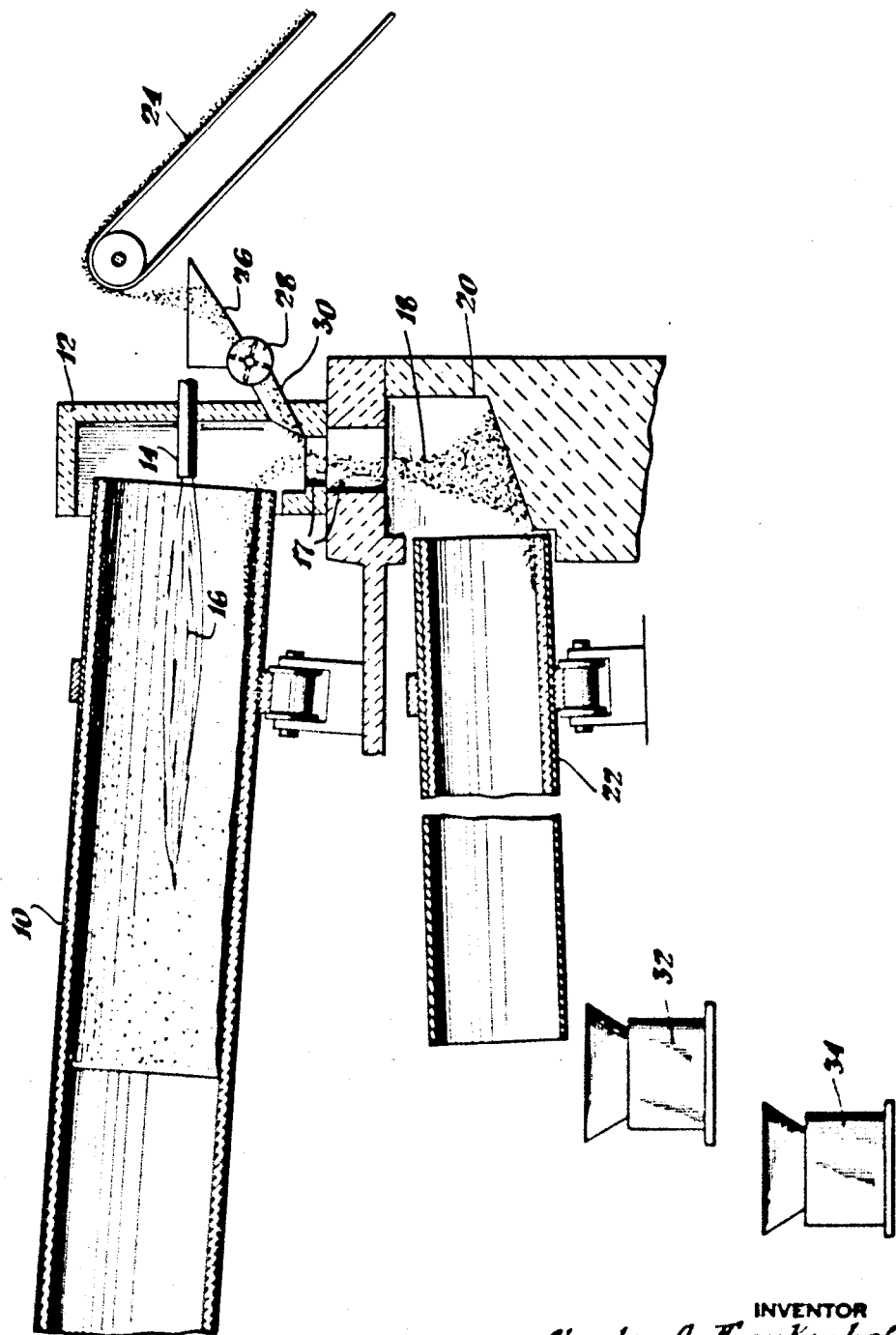
INVENTOR
Charles A. Frankenhoff
BY
Robert _____
ATTORNEY Patented Oct. 6, 1953

2,654,674

UNITED STATES PATENT OFFICE 2,654,674

DIATOMACEOUS EARTH AND PORTLAND CEMENT COMPOSITIONS

Charles A. Frankenhoff, Scarsdale, N. Y.

Application October 9, 1950, Serial No. 189,129

4 Claims. (Cl. 106—90)

This invention relates to diatomaceous earth and Portland cement composition and method of making it.

Advantages in the use of diatomaceous earth as an admix in Portland cement have been recognized for twenty-five years or more. There is, first of all, increased workability of the wet mix which is being placed. In the cured cement concrete, the diatomaceous earth improves the water tightness, increases the strength, and decreases the rate at which the concrete is attacked by sea water.

A disadvantage has restricted somewhat the use of diatomaceous earth in Portland cement concrete. This is the tendency of the admixed earth to absorb water and make the mixture somewhat dry when only the usual proportion of water is mixed or, conversely, to require the addition of slightly more than the usual proportion of water if the water is added in sufficient amount to overcome the water absorption effect of the diatomaceous earth.

There has been also another sales handicap. The drying and milling of diatomaceous earth for incorporation into cement mortars or concrete require large-scale operation and expensive machinery, for economical production. As a result, the diatomaceous earth additive has come from the large producers. These are located on the Pacific coast and the cost of the earth delivered on the Atlantic seaboard, for example, has led to some objection.

I have now discovered a method which eliminates the undesired high water absorption of diatomaceous earth used in Portland cement mixtures and makes possible the supplying of diatomaceous earth economically from producers without expensive processing equipment, in form that may be used as an admixture in Portland cement.

My invention provides, in addition, a method of shock cooling cement clinker after discharge from the calcining kiln, and, at the same time, drying the wet diatomaceous earth additive, and milling or grinding it to a certain extent in the cooler. It further provides for the intergrinding of the diatomaceous earth and clinker, so as to grind the resulting powder of diatomaceous earth into the particles of Portland cement, with which the earth is to show a special action during the subsequent setting of the Portland cement. My invention provides, finally, for the inclusion of the diatomaceous earth in such form that its water absorption is reduced to approximately one-half or less of the water absorption of the conventional diatomaceous earth.

Briefly stated, my invention comprises the introduction of wet diatomaceous earth in lump or other form and without predrying into the hot clinker from rotary cement kilns, tumbling the resulting material as in a conventional rotary cement clinker cooler, and then milling the cooled product until the characteristic structure of the particles of diatomaceous earth is substantially destroyed, that is, the particles become amorphous.

The invention will be illustrated by description in connection with the attached drawings to which reference is made.

The figure is a side view partly in section and partly diagrammatic of apparatus for carrying out my invention.

There is shown a rotary cement kiln 10 with usual firing head 12, burner 14, and flame 16 with opening 17 through the firing head. Through the opening falls the clinker 18 into chute 20 which delivers the clinker to the rotary clinker cooler 22.

Shown also is belt conveyor 24 for delivering diatomaceous earth to a position above chute 26 with metering device 28 and outlet 30 into the stream of clinker passing through the said opening in the firing head of the kiln.

Disposed below the lower or discharge end of the clinker cooler is the grinder 32 and below this the fine milling equipment 34 such as a tube or ball mill, the grinder and mill being shown diagrammatically.

All details not shown are conventional as are also the materials of construction of the various parts of the equipment.

In operation the cement making materials are calcined in the usual manner in the kiln 10, discharged to the clinker cooler, and mixed as shown with the diatomaceous earth from the conveyor 24. The mixture so made is then maintained in contact, as during the passage through the cooler 22, until the clinker is cooled and the diatomaceous earth is mixed therewith and dried by the heat supplied by the hot clinker. The cooled mixture is then reduced in size in the equipment 32 and 34, to the fineness required for commercial ground Portland cement.

As to materials, I use a naturally occurring diatomaceous earth containing at least 70% of silica and of moisture content approximately that which occurs in the freshly severed diatomaceous earth. This moisture content varies with different deposits and with different seasons of the year, as from 10% to 70% or so of water on the weight of the crude material, and is normally around 35% to 55% for many of the more important deposits of the earth. The earth is preferably crushed, is partly or wholly milled, as to fineness 30 to 100 mesh or finer, before being mixed with the clinker.

The cement clinker is that which is the usual discharge from the firing end of rotary Portland cement kilns. It is ordinarily in the form of lumps or irregularly shaped masses with some finer particles present.

In a modification of the invention, I use a surface active agent which promotes subsequent wetting with water when the wet Portland cement mix is being prepared for casting. This has a favorable effect upon the properties of the set or cured cement or concrete.

The agent used is a material that is surface active, stable, and effective in contact with wet Portland cement. Examples of surface active agents which meet these requirements and which may be used in my cement composition are the alkali metal salts of sulfated and sulfonated higher alcohols such as those of dodecyl alcohol or other $C_{12}$–$C_{18}$ alcohol, alkali metal salts of keryl benzene sulfonate, ethylene oxide complexes of lower alkyl phenols such as amyl or octyl phenol, surface active amines such as diethylene triamine, lauryl amine, or tetraethylene pentamine and substantialy neutral alkali metal soaps of which sodium oleate and stearate are examples.

As to conditions of mixing of the materials, I introduce the diatomaceous earth into the cement clinker in hot condition but at a temperature below that at which diotomaceous earth in the proportion used would be heated to the temperature of incipient fusion, this temperature being about 1500°–1800° F. and varying somewhat in known manner for the various grades of diatomaceous earth. I have found it satisfactory to introduce the diatomaceous earth at the usual commercial temperatures at which the clinker passes from the discharge end of Portland cement kilns into the upper end of the conventional rotary clinker coolers. With a relatively small proportion of diatomaceous earth to the clinker, I make the addition at a temperature of the clinker of at least 1400–1800° F., whereas with larger proportions of the diatomaceous earth I may use clinker temperatures as high as any which are encountered in commercial cement clinker coolers. Thus I may introduce the earth in large proportion when the clinker is within the range of 1800° to 2200° F.

The time of contact of the diatomaceous earth with the clinker in the cooler is that which is usual in the ordinary operation of Portland cement clinker coolers. It is the time required for the mixture to tumble through the clinker cooler, inclined at the usual angle, rotated at the usual speed, and with the usual rate of production per cooler.

After the diatomaceous earth and clinker mixture issues in cooled form from the lower end of the cooler, the mixture is then subjected to conventional crushing and milling operations, the final milling being effected to advantage by the usual type of ball or tube mill and the fineness to which the material is reduced being that which is standard for commercial Portland cement powder.

Because of the relatively great friability of the diatomaceous earth, as compared to the harder Portland cement, the diatomaceous earth is thus reduced to the stage at which it is practically amorphous, that is, without the characteristic microscopic appearance of the original particles of diatomaceous earth or to the stage where at least 90% of the particles are of size one micron or smaller. By the time the Portland cement has been so reduced in the milling operation that it passes to the extent of 96% by weight through a 200-mesh screen, the earth will be milled to the required fineness.

At this stage also, the diatomaceous earth will have a density by standard test method of approximately 30–40 pounds to the cubic foot.

The earth will also have a water absorption of 140% or less. This water absorption and wet density are determined by the standard test which is as follows:

A 5-gram sample of milled diatomaceous earth is mixed with 50 cc. of water in the tube, with tapered graduated bottom, of a standard laboratory centrifuge. The centrifuge is then rotated at 1000 to 1500 R. P. M. for five minutes. The supernatant liquid is poured off and measured for volume. This volume subtracted from 50 cc. shows the amount of water retained by 5 g. of the earth. The retained or absorbed water is calculated as the percentage of the earth used, on the dry basis. The volume of the centrifuged sediment is read; from this the wet density of the earth is calculated.

The surface active agent, being organic, is added to the composition after the composition has been cooled to a temperature below the decomposition point of the agent. This should be not much above 350° F. Preferably the surface active agent is mixed into the ground, cool mixture of the diatomaceous earth and Portland cement just in advance of final grinding or of the usual bagging operation.

The proportion of the surface active agent used is low as, for instance, 0.03 to 0.3% of the combined weight of diatomaceous earth and clinker after the drying of the earth is completed.

The proportion of the wet diatomaceous earth used is not in excess of that which may be dried by the heat of the originally hot Portland cement clinker.

Since the heat required to raise 1 pound of water from ordinary temperature to the boiling point at atmospheric pressure and to evaporate the water is roughly 1100 B. t. u. and since the specific heat of Portland cement clinker is about 0.22, the proportion of water that may be evaporated by the heat of the clinker is calculated readily from the temperature at which the clinker first contacts the diatomaceous earth and the temperature of the clinker after cooling. When, for instance, the earth is mixed with a clinker of temperature 1700° F. and the clinker is cooled to 300° F., there is a drop in temperature of 1400° F. This, multiplied by the specific heat of the clinker, shows that the heat available per pound of the clinker is about 308 B. t. u's. This, after correction for the heat losses, is the heat available for evaporating water from the added diatomaceous earth. In other words, 1 pound of the clinker cooling through 1400° F. is able to evaporate approximately $308/1100$ or approximately 0.28 pound of water less the amount corresponding to heat losses from the cooler.

For this reason and with the clinker at the usual temperature, I use diatomaceous earth in proportion to supply not more than about one-fourth to one-fifth pound of water for 1 pound of the clinker.

This means that, when the diatomaceous earth is supplied in the quarry-wet condition contains 50% of water, I use not more than about 0.4 to 0.5 pound of the wet earth for each pound of the clinker. This corresponds to about one-fifth to one-fourth pound of the diatomaceous earth on the dry basis for each pound of the clinker.

In any case, I use the diatomaceous earth in such proportion that the heat supplied by the clinker in cooling leaves no more than 3% of water associated with the diatomaceous earth.

The invention is further illustrated by description in connection with the following specific examples of the practice of it.

Example 1

The general procedure described above is followed, the clinker being discharged from kiln 10 at a temperature of about 200° F. and mixed with wet diatomaceous earth in the form of milled material of size to pass mostly through 100 mesh. The diatomaceous earth is one containing 72% of silica on the dry basis and containing 45% of water. The remainder of the solid material is principally sand and clay.

The diatomaceous earth is introduced in the proportion of 0.4 pound on the wet basis to 1 pound of the clinker.

The product issuing from the final milling in the mill 34 is so fine as to pass to the extent of 94% through a 200 mesh screen, contains the earth in substantially amorphous form and with less than 3% of water. The product so made gives a placed and set cement or concrete of high strength and requires substantially no higher proportion of water to solids in placing than ordinary Portland cement.

Example 2

The procedure of Example 1 is followed except that there is introduced into the material in the mill 34 sodium oleate (soap) in the proportion of 0.2% of the dry weight of the mixture of cement and diatomaceous earth.

Example 3

The procedure of Example 2 is followed except that the soap is replaced in turn by each of the other surface active agents recited earlier herein.

It will be understood that it is intended to cover all changes and modifications of the examples of the invention herein chosen for the purpose of illustration which do not constitute departures from the spirit and scope of the invention.

What I claim is:

1. In making a Portland cement and diatomaceous earth composition, the method which comprises introducing, into cement clinker at a temperature of at least 1500°–1800° F., diatomaceous earth wet with water and in proportion providing no more than about one-fifth to one-fourth part by weight of water and also of diatomaceous earth on the dry basis for each part of the clinker, maintaining contact between the clinker and the diatomaceous earth until the clinker is cooled, and then without additional heating subjecting the resulting mixture to grinding and milling to the form of powder of fineness standard for commercial Portland cement, the steps described causing shock cooling of the clinker, drying of the diatomaceous earth, reduction of the diatomaceous earth to amorphous form characterized by relatively low capacity for water absorption, and spreading of the said earth as a fine powder upon the particles of the ground cement.

2. The method of claim 1, the said mixture of diatomaceous earth and clinker being ground until at least 94% by weight of the mixture will pass through a 200-mesh screen.

3. The method of claim 1 including admixing a surface active agent that is stable in contact with wet Portland cement at a temperature below the decomposition point of the agent.

4. A cement composition including intimately mixed Portland cement, diatomaceous earth and a surface active agent that is stable in contact with wet Portland cement, the surface active agent being used in the proportion of 0.03 to 0.3 part for 100 parts of the cement and diatomaceous earth on the dry basis and the proportion of the diatomaceous earth being not more than one-fifth to one-fourth part to one part of the cement.

CHARLES A. FRANKENHOFF.

References Cited in the file of this patent

UNITED STATES PATENTS

| Number | Name | Date |
|---|---|---|
| 1,562,207 | Croll | Nov. 17, 1925 |
| 1,976,132 | Larmour et al. | Oct. 9, 1934 |
| 2,133,622 | Larmour et al. | Oct. 18, 1938 |
| 2,236,251 | Scripture | Mar. 25, 1941 |
| 2,311,289 | Booth | Feb. 16, 1943 |
| 2,360,518 | Scripture | Oct. 17, 1944 |